US012649227B2

(12) United States Patent (10) Patent No.: US 12,649,227 B2
Kumar et al. (45) Date of Patent: Jun. 9, 2026

(54) METHOD FOR LOCALIZING A MOBILE CONSTRUCTION ROBOT ON A CONSTRUCTION SITE USING SEMANTIC SEGMENTATION, CONSTRUCTION ROBOT SYSTEM AND COMPUTER PROGRAM PRODUCT

(71) Applicant: Hilti Aktiengesellschaft, Schaan (LI)

(72) Inventors: Nitish Kumar, Buchs (CH); Sascha Korl, Buchs (CH); Abel Gawel, Greifensee (CH); Hermann Blum, Zürich (CH); Francesco Milano, Zürich (CH); Roland Siegwart, Schwyz (CH); Cesar Cadena, Zürich (CH); René Zurbrügg, Wetzikon (CH)

(73) Assignee: Hilti Aktiengesellschaft, Schaan (LI)

( * ) Notice: Subject to any disclaimer, the term of this patent is extended or adjusted under 35 U.S.C. 154(b) by 266 days.

(21) Appl. No.: 18/284,646

(22) PCT Filed: Apr. 13, 2022

(86) PCT No.: PCT/EP2022/059830
§ 371 (c)(1),
(2) Date: Sep. 28, 2023

(87) PCT Pub. No.: WO2022/228897
PCT Pub. Date: Nov. 3, 2022

(65) Prior Publication Data
US 2024/0181625 A1 Jun. 6, 2024

(30) Foreign Application Priority Data
Apr. 30, 2021 (EP) .................................... 21171587

(51) Int. Cl.
*G06T 7/11* (2017.01)
*B25J 5/00* (2006.01)
(Continued)

(52) U.S. Cl.
CPC ............. *B25J 5/007* (2013.01); *B25J 11/005* (2013.01); *G06T 7/11* (2017.01); *G06T 7/73* (2017.01); *G06T 2207/20081* (2013.01)

(58) Field of Classification Search
CPC .......... B25J 5/007; B25J 11/005; B25J 11/00; G06T 7/11; G06T 7/73;
(Continued)

(56) References Cited

U.S. PATENT DOCUMENTS 10,546,196 B2 * 1/2020 Witt ........................ G06V 20/64
10,650,531 B2 * 5/2020 Lakshmi Narayanan ...................
G06T 5/50
(Continued)

FOREIGN PATENT DOCUMENTS

WO WO 2019185170 A1 10/2019

OTHER PUBLICATIONS

International Searching Authority, International Search Report in International Application No. PCT/EP2022/059830, mailed Aug. 26, 2022.
(Continued)

*Primary Examiner* — Bobbak Safaipour
(74) *Attorney, Agent, or Firm* — Leydig, Voit & Mayer, Ltd.

(57) ABSTRACT

A method of localizing a mobile construction robot on a construction site, wherein environment data of the construction site is captured, wherein a pose of the mobile robot is inferred using the environment data disclosed, wherein the method comprises a step of semantic segmentation, wherein a semantic classifier having an updatable semantic model classifies the environment data into at least two semantic classes, wherein the semantic model is updated at least once. Furthermore, the invention concerns a mobile construction robot system and a computer program product. The invention provides solutions for a robust and precise localization of the mobile construction robot.

20 Claims, 3 Drawing Sheets

Figure 1:
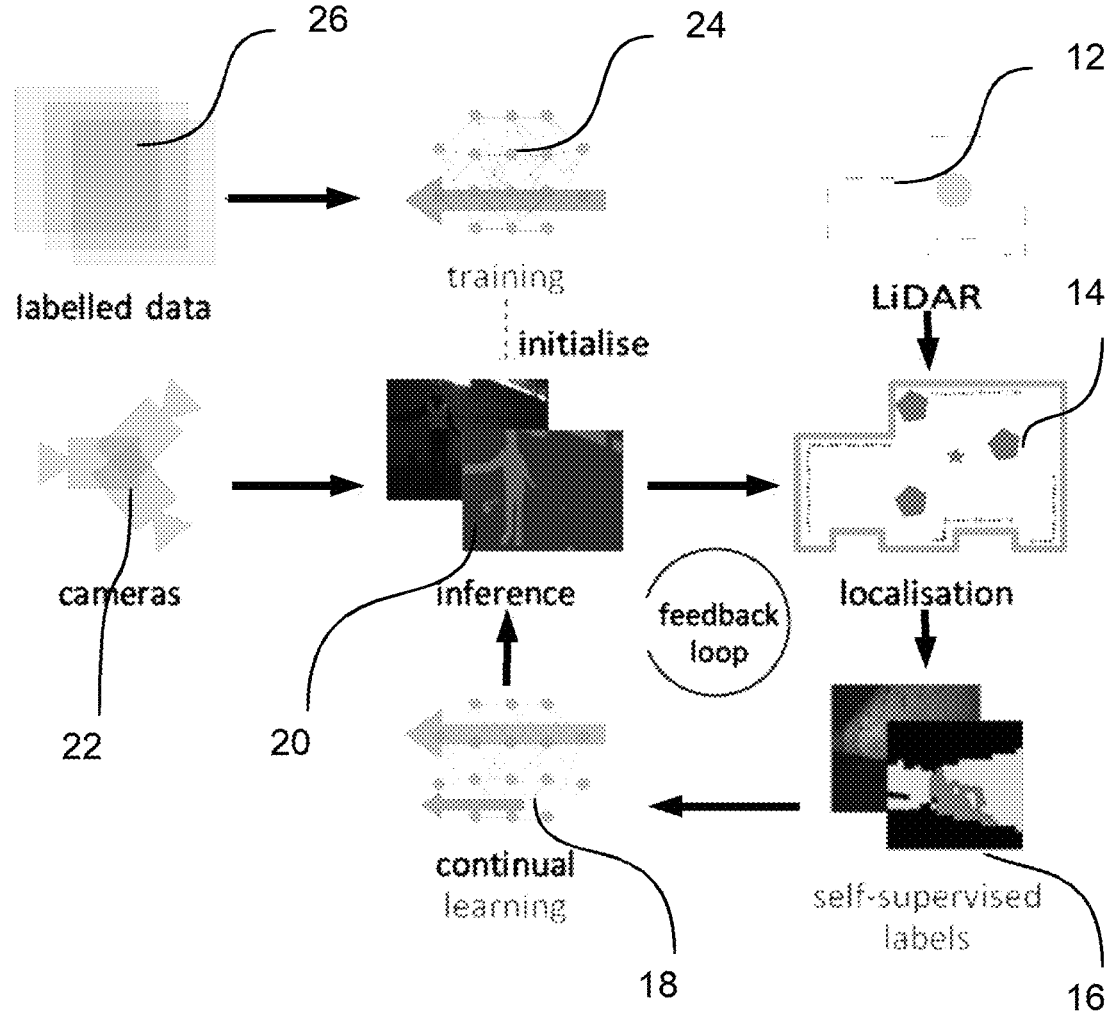

(51) Int. Cl.
 *B25J 11/00* (2006.01)
 *G06T 7/73* (2017.01)
(58) Field of Classification Search
 CPC . G06T 2207/20081; G06T 2207/20084; G06T
 2207/30244; G06T 7/194; G05D 1/024;
 G05D 1/0274; G05D 1/0246; G01C 21/20
 See application file for complete search history.

(56) References Cited

U.S. PATENT DOCUMENTS

| | | | | |
|---|---|---|---|---|
| 10,678,257 | B2* | 6/2020 | Schulter .................... | G06T 7/50 |
| 2003/0195883 | A1* | 10/2003 | Mojsilovic ............. | G06V 10/40 |
| 2018/0012125 | A1* | 1/2018 | Ladha ..................... | G06N 3/08 |
| 2018/0253108 | A1* | 9/2018 | Heinla ..................... | G05D 1/65 |
| 2019/0094875 | A1 | 3/2019 | Schulter et al. | |
| 2019/0205485 | A1* | 7/2019 | Rejeb Sfar .............. | G06F 30/13 |
| 2019/0250627 | A1* | 8/2019 | Witt .......................... | G06N 7/01 |
| 2019/0287254 | A1 | 9/2019 | Lakshmi Narayanan et al. | |
| 2020/0300639 | A1* | 9/2020 | Salfity ....................... | G06T 7/11 |
| 2020/0364554 | A1* | 11/2020 | Wang ..................... | G06V 20/56 |
| 2023/0415331 | A1* | 12/2023 | Larsson .................. | B25J 5/007 |
| 2024/0181639 | A1* | 6/2024 | Kumar .................... | G05D 1/49 |
| 2025/0278920 | A1* | 9/2025 | Raj ...................... | G06V 10/273 |

OTHER PUBLICATIONS

International Searching Authority, Written Opinion in International
Application No. PCT/EP2022/059830, mailed Aug. 26, 2022.

* cited by examiner

26

24

12 labelled data training initialise

LiDAR

14 cameras inference feedback loop localisation

22

20 continual learning self-supervised labels

18

16

10

METHOD FOR LOCALIZING A MOBILE CONSTRUCTION ROBOT ON A CONSTRUCTION SITE USING SEMANTIC SEGMENTATION, CONSTRUCTION ROBOT SYSTEM AND COMPUTER PROGRAM PRODUCT

CROSS-REFERENCE TO RELATED APPLICATIONS

This patent application is the U.S. National Stage of International Patent Application No. PCT/EP2022/059830, filed Apr. 13, 2022, which claims the benefit of European Patent Application No. 21171587.5, filed Apr. 30, 2021, which are each incorporated by reference.

The present invention relates to a method for localizing a mobile construction robot on a construction site.

The usefulness of a mobile construction robot on a construction site increases with its autonomy. It is thus of particular interest if the mobile construction robot is capable of inferring its position on a construction site in an autonomous, precise and robust manner.

Numerous efforts have been made to this end to date. One approach consists in using map data of the construction site, e.g. building information model (BIM) data in combination with, for example, a total station or the like. Nonetheless, such solutions lack flexibility and usability and often require manual interventions.

Even if BIM data are available for a specific construction site, a localization solely based on such BIM data and, for example, distance measurements, regularly fails due to interfering objects like persons, power tools, material depositions, or the like on the construction site.

Therefore, it is an object of the present invention to provide a robust and precise method for localizing a mobile construction robot on a construction site.

This is achieved in a number of aspects of the present invention, in which a first aspect is a method of localizing a mobile construction robot on a construction site, wherein environment data of the construction site is captured, wherein a pose of the mobile robot is inferred using the environment data, wherein the method comprises a step of semantic segmentation, wherein a semantic classifier having an updatable semantic model classifies the environment data into at least two semantic classes, wherein the semantic model is updated at least once.

The pose may comprise a position and/or orientation of the mobile construction robot, in particular in reference to the construction site.

Particularly preferably the environment data comprises 3D environment data. The environment data may be obtained by distance measurement sensors, e.g. by a LIDAR scanner or a time-of-flight camera.

Thus, it is an idea of the invention to semantically segregate different parts of the captured environment data.

In particular the environment data may be classified in regard to the usefulness of the data for localizing the mobile construction site robot. Thus, noisy or even interfering data can be detected and discarded from the environment data. Hence, it permits a robust and precise localization based on a purposive selection of the environment data, in particular in the presence of, for example, clutter on the construction site.

The environment data may be captured by the mobile construction robot itself. All sensor equipment may thus be on-board of the mobile construction robot. Hence, the autonomy of the mobile construction robot may be increased.

In a preferred variant of the method the semantic model may be updated using the environment data. Thus, the environment data may be used for localizing the mobile construction robot and for improving the semantic classifier. This, in turn, may further augment the robustness and/or precision of the localization.

The semantic classifier classifies the environment data into a set of classes. The set of classes may contain a finite number of semantic classes.

Preferably, at least one of said semantic classes may correspond to a construction site background and at least one of said semantic classes may correspond to a construction site foreground.

The classes, in particular the background and foreground classes, may relate to the immutability of objects detected in the environment data, e.g. walls versus tables or moving animals; and/or, preferably, refer to the probability that the environment data is mapped in an available set of map data, e.g. BIM data. "Background" may comprise, for example, environment data of walls, ceilings, floors, or the like. In particular, it may comprise elements that usually are represented in map data or, respectively, BIM data. "Foreground" may comprise other elements, in particular inferring objects like persons, furniture, equipment, or the like.

Preferably, the pose may be inferred using a subset of the environment data that is classified as construction site background. So, environment data may be stripped off data classified as construction site foreground. Unclassified data may also be stripped off. Subsequently, the localization may be executed based on the remaining environment data, in particular solely based on environment data classified as background. Of course, if finer classifications are available, the additional semantic information may also be taken into consideration. For example, if a plurality of background classes is available, e.g. separate classes for walls, ceilings, floors, or the like, this additional semantic information may facilitate a matching of the environment data with available BIM data.

The quality, in particular the rate of correct classifications, may be improved if the semantic segmentation of the environment data is refined at least once using at least one additional data set, preferably an image data set. For this, superpixels may be generated, for example by using a simple linear iterative clustering (SLIC)-algorithm.

Preferably, the pose may be inferred using map data of the construction site, e.g. BIM data. In particular, the environment data or a selection thereof may be matched to the map data in order to infer the position and/or the orientation of the mobile construction robot.

The semantic classifier may be trainable. Thus, in order to adapt the semantic classifications to different domains, the semantic model may be updated multiple times, preferably regularly. The update may use current or previous semantic segmentation data and/or current or previous environment data or a selection thereof.

To counteract catastrophic forgetting the semantic model may be updated with a mix of current and previously gathered semantic segmentation data.

Whereas traditional methods of semantic segmentation allow for the introduction of new classes across different semantic segmentation tasks, the invention focuses on classifying environment data, in particular according to its usefulness for localization. Thus, it is preferred that the set of said semantic classes is fixed for all semantic segmentations. In this sense, the invention tackles the problem of domain adaptation, in which the goal is to tune the semantic classifier towards better generalization to a new domain (target) which possibly has a large semantic gap from the one of which the semantic classifier is trained (source).

Another aspect of the invention relates to a construction robot system comprising a mobile construction robot, configured for working on a construction site, for example for drilling, chiselling, grinding, plastering and/or painting, and a control unit, wherein the control unit is configured to localize the mobile construction robot using the method according to the invention.

The mobile construction robot may comprise a mobile base for moving at least on one of the construction site's floor, its ceiling, or one of its walls. The mobile base may be unidirectional, multidirectional or omnidirectional. It may comprise wheels and/or tracked wheels. Alternatively, it may also be or comprise a legged mobile base. Additionally, or alternatively, the mobile construction robot, in particular the mobile base, may be an aerial vehicle, in particular an unmanned aerial vehicle, also known as a "construction drone".

It may be configured to at least one of grasping or moving an object, drilling, chiselling, grinding, plastering, or painting.

The mobile construction robot may comprise the control unit. Additionally, or in the alternative, the control unit may be, or at least partly, external to the mobile construction robot. The control unit may be, at least partly, part of a cloud-based computing system. The control unit may be configured to control a plurality of mobile construction robots. In particular, the same semantic classifier or at least its semantic model may be used for a plurality of mobile construction robots. Thus, a training of the semantic classifier may be beneficial to several ones of the plurality of mobile construction robots.

In a preferred embodiment the mobile construction robot comprises a 3D sensor, e.g. a LIDAR scanner or a stereoscopic camera system, and at least one camera. Thus, the 3D sensor may provide 3D environment data as environment data, which is enriched by image data, e.g. RGB-image data, provided by the at least one camera.

Another aspect of the invention relates to a computer program product including a storage readable by a control unit of a construction robot system, the storage carrying instructions which, when executed by the control unit, cause the control unit to execute the method according to the invention.

The invention will be described further, by way of example, with reference to the accompanying drawings which illustrate preferred variants thereof, it being understood that the following description is illustrative of and not limitative of the scope of the invention. The features shown there are not necessarily to be understood to scale and are presented in such a way that the special features of the invention are clearly visible. The various features may be realized individually or in combination in any desired way in variants of the invention.

In the drawings:

FIG. 1 shows an overview of the method according to the invention;

FIGS. 2a, 2b, 2c, and 2d show different stages of semantic classification; and

Figure 3:
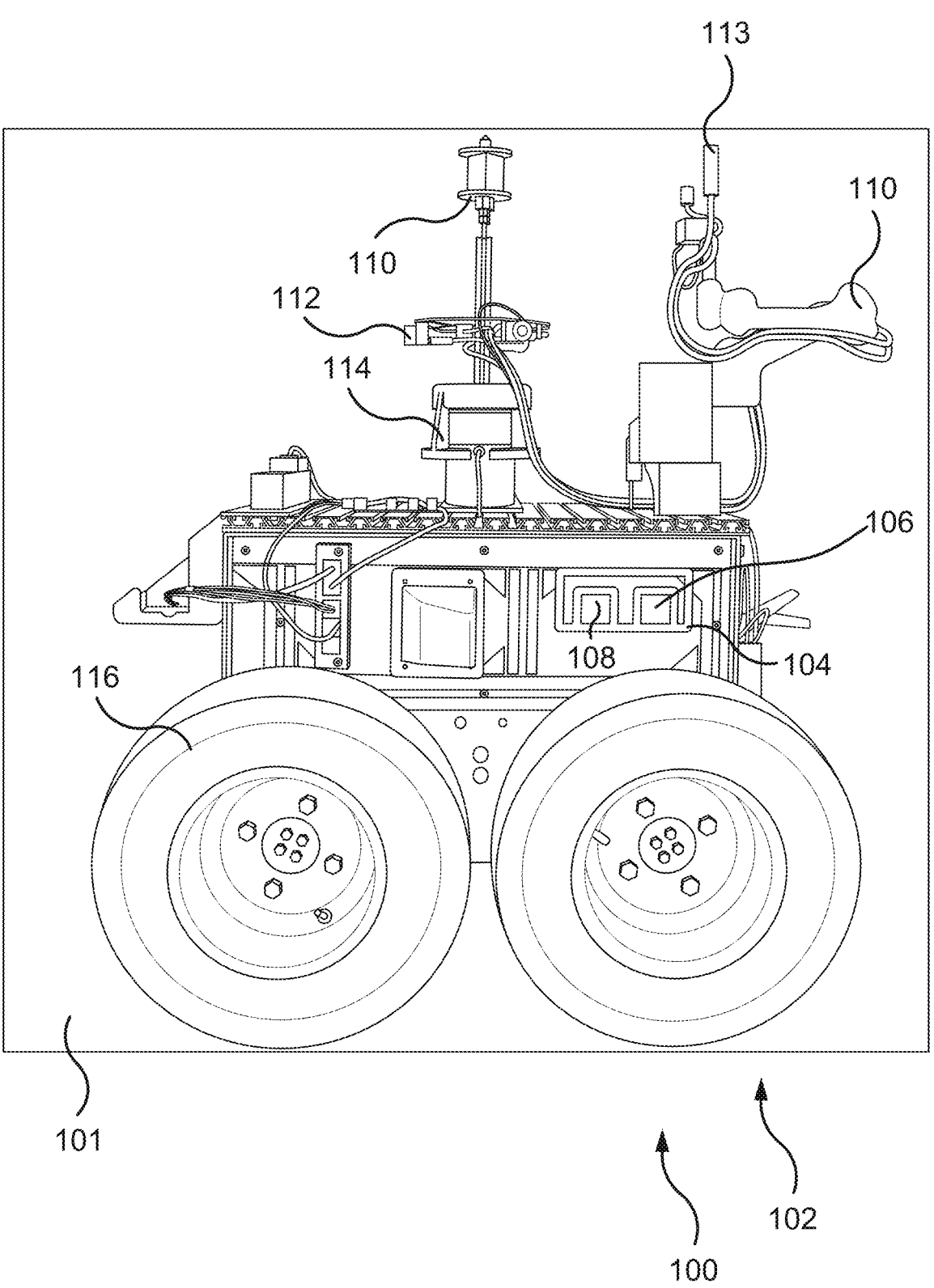

FIG. 3 shows a construction robot system.

As far as possible, same reference signs are used for functionally equivalent elements within the description and in the figures.

FIG. 1 schematically shows an overview of the method 10 according to the invention, which will be described in more detail in the following section.

The method 10 and, hence, the construction robot system applying the method 10 according to the invention combine the concepts of continual learning and of self-supervision.

Environment data 12 is captured by a LIDAR scanner. By matching the environment data 12 with a BIM model 14, representing, e.g. a floorplan of the construction site, an initial pose estimate and an initial set of pseudo-labels 16 are generated during a localization step.

A semantic classifier 18 comprising a continually learned semantic model serves as an input filter to the localisation, semantically segmenting a scene 20 observed by a camera system 22, comprising one or more cameras, in this embodiment one camera monitoring the rear left, one camera monitoring the center, and one camera monitoring the rear right, into segments, e.g. superpixels, classified as construction site foreground or as construction site background. This refined segmentation is fed forward into the localization.

The set of semantic classes are not arbitrary class labels, but purposively selected by the observable affordance that some parts of a current scene are mapped (construction site background) and some are not (construction site foreground). Therefore, pseudo-labels are created based on the localisation in reference to the BIM model 14 to train the semantic classifier 18, whereas the segmentation into construction site foreground and construction site background informs the localisation.

This creates a feedback loop that can yield improvements for both parts of the procedure, in particular for the quality of the semantic classification and for the robustness and the precision of the localisation, i.e. the pose detection. On average, experiments showed improvements of semantic segmentation by 60% and median localisation error by 10% during deployment. Thus, a life-long self-supervised learning of semantic classification of scenes 20 is achieved. The invention tackles several topics, of which the following topics will be discussed in more detail:

Matching environment data with the BIM model 14 for localisation,

Pseudolabel generation for self-supervision based on a multi-modal calibration and the available BIM model 14, and Integration of continual learning methods with respect to domain adaptation in semantic segmentation Localisation The mobile construction robot is localized based on aligning the environment data 12 from the LIDAR scans with the given floorplan in the form of the BIM model data 14.

Given a building model mesh M representing the BIM model 14, a point-cloud P representing the environment data 12, and an initial alignment $$T_{mesh \to lidar}^{(t=0)}$$

subsequent mobile construction robot poses may be found as $$T_{mesh \to lidar}^{(t)} = ICP\left(M, P^{(t)}, T_{mesh \to lidar}^{(t-)}\right)$$

where ICP is a point-to-plane ICP according to Yang Chen and Gerard Medioni, "Object modelling by registration of multiple range images", Image and Vision Computing, 10(3): 145-155, 1992. The ICP filters out points of large distance and other criteria.

The point-to-plane ICP is preferably run with three nearest neighbors and initialised on the previously solved pose. Furthermore, multiple filters are applied to the input. These filters may also be applied after the semantic filtering:

The LIDAR scans are required to have at minimum 500 points; thus, scans are rejected where the segmentation classified nearly everything as construction site foreground.

The LIDAR scans are subsampled to a maximum density of 10,000 points/m³.

After nearest neighbour association, 20% of points that are the furthest away from the BIM model 14 are rejected.

Furthermore, associations are rejected where the estimated surface normal, estimated based on the 10 nearest neighbours, have a larger angle deviation than 1.5 rad.

Furthermore, for very cluttered 3D environments or, respectively, construction sites, additional filters may be enforced in order to localise without segmentation: For example, only four degrees of freedom, in particular x, y, z, yaw, may be inferred. Normal directions may be based on 30 nearest neighbours. Points may only be associated to the BIM model data 14 if the angle between the normals is below 0.8 rad.

To further divide the point-cloud P into construction site foreground and construction site background points, image data from the camera system 22 is used as additional information.

After having the image data from the camera system 22 semantically classified, a static point-cloud $P_{static}$ is extracted from the point-cloud P as those points $p \in P$ whose reprojected pixel in the image frame is classified as construction site background.

Accordingly, localisation, i.e. pose detection, is based on $$ICP\left(M, P_{static}^{(t)}, T_{mesh \rightarrow lidar}^{(t-1)}\right).$$

Semantic Classification

FIGS. 2*a* to 2*d* show different stages during the generation of pseudo-labels and, hence, during the semantic classification.

For each camera of the camera system 22 semantic classifications ("pseudo-labels") are generated by labelling the captured point-cloud of the environment data 12 leveraging a current pose estimate as well as the BIM model data 14 of the construction site.

Figure 2A:
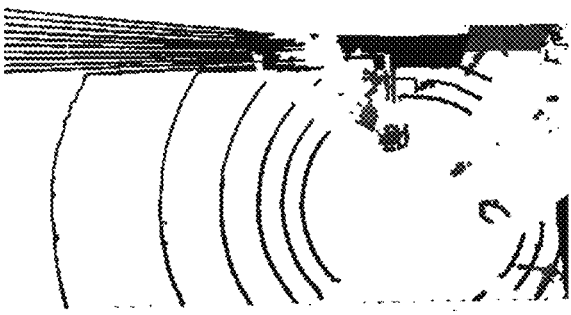

As an example, FIG. 2*a* schematically shows a mesh according to BIM model data 14 and a point-cloud corresponding to environment data 12 from a LIDAR scan as an overlay image.

In this variant of the method 10, the data is classified into three different classes: construction site foreground, construction site background and unknown.

The classes are created in two steps. First, for each point of the localised environment data 12, we calculate the distance to the closest plane of the mesh according to the BIM model data 14 using a fast intersection and distance computation according to Pierre Alliez, Stephane Tayeb, and Camille Wormser, "3D fast intersection and distance computation". In *CGAL User and Reference Manual*. CGAL Editorial Board, 5.2 edition, 2020; https://doc.cgal.org/5.2/Manual/packages.html#PkgAABBTree.

Figure 2B:
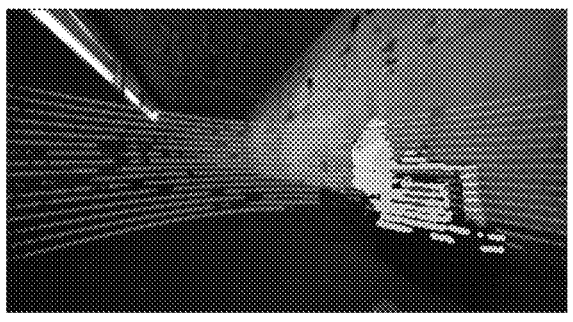

If the distance surpasses a given threshold δ, the point is assigned the construction site foreground class, otherwise it is assigned the construction site background class. Empirically, the distance threshold is set to δ=0.1 m. FIG. 2*b* schematically shows the result of this preliminary classification as an image of the camera system 22 overlaid with a projection of the classified point-cloud. Pixels in black along the LIDAR scan lines correspond to the class unknown, pixel in light grey along the LIDAR scan lines the correspond to construction site foreground and the remaining pixels along the LIDAR scan lines correspond to construction site background. Thus, according to FIG. 2*b* an area comprising a worker and some equipment has been classified as foreground on the right half of FIG. 2*b*.

Figure 2C:
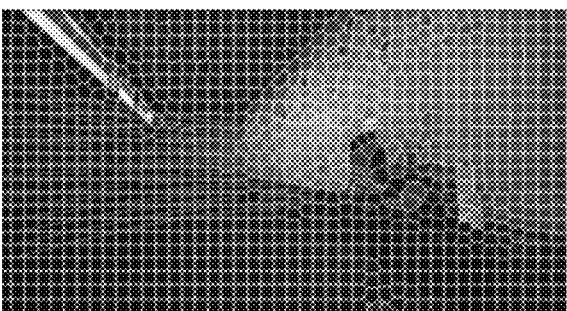

In the second stage, the projection is refined using superpixels created with a simple linear iterative clustering (SLIC-) algorithm, which utilizes k-means clustering. FIG. 2*c* schematically shows an example of a resulting oversegmented image with a mesh according to the superpixels. In particular, this mesh may correspond to the outlines of the superpixels.

In particular, the image is oversegmented into a superpixel set S. A superpixel $s \in S$ is then assigned a class according to a majority voting of the contained projected classes. The segmentation is further improved by discarding superpixels whose depth variance surpasses a given threshold.

Superpixels with a depth variance that surpasses 0.5 m are discarded. Images are smoothed with a Gaussian kernel (σ=0.2). The images are oversegmented into approximately 400 superpixels with SLIC parameter compactness=10.

Instead of the SLIC-algorithm, other superpixel algorithms may be employed alternatively, e.g. the SCALP-algorithm according to Remi Giraud, Vinh-Thong Ta, and Nicolas Papadakis; "SCALP: superpixels with contour adherence using linear path"; *CoRR*, abs/1903.07149, 2019; http://arxiv.org/abs/1903.07149.

Furthermore, depending on the type of environment the standard deviation threshold may be increased to 1 m or more, in particular in case if large amounts of clutter are to be expected.

Figure 2D:
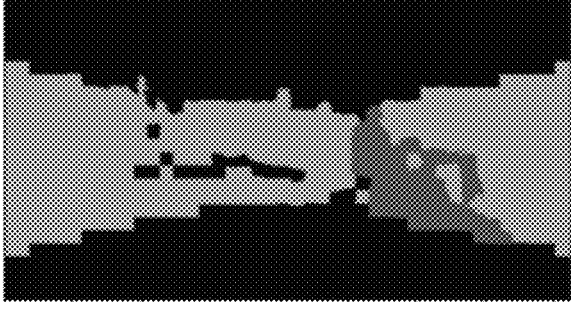

FIG. 2*d* schematically shows an example of a resulting semantic classification, wherein black pixels are classified by the majority voting as unknown, pixels in dark grey are classified as construction site foreground, and pixels in light grey are classified as construction site background.

It has been found out that the quality of classification or, respectively, of the pseudo-labels, is sufficient to be used as a training signal for retraining the semantic model of the semantic classifier 18. A particular advantage of the method 10 according to the invention is that the classification can be generated on-the-fly without requiring any external supervision.

Domain Adaptation

To improve the semantic classification, the semantic classifier 18 having a semantic model in the form of a neural network architecture is trained on different data sources.

To cater to the goal of online learning, a lightweight network architecture based on Fast-SCNN according to Rudra P K Poudel, Stephan Liwicki, and Roberto Cipolla, "Fast-SCNN: Fast Semantic Segmentation Network"; In British Machine Vision Conf. (BMVC), 2019, is used for the semantic classifier 18.

The semantic model is pre-trained with labelled data 26 (see FIG. 1), e.g. the NYUDepth v2 dataset (Nathan Silberman, Derek Hoiem, Pushmeet Kohli, and Rob Fergus; "Indoor Segmentation and Support Inference from RGBD Images"; In European Conf. on Computer Vision (ECCV), 2012), which contains 1449 images extracted from video sequences of indoor scenes, each with per-pixel semantic annotations. Of this data set the classes "wall", "ceiling", and "floor" were mapped to the construction site background class, whereas the remaining classes were mapped to the construction site foreground class.

A pre-training step 24 (see FIG. 1) is performed as an initial step to allow the semantic model to acquire prior knowledge that can then be leveraged as an inductive bias to perform the same semantic segmentation task on subsequently captured data.

The semantic model is then fine-tuned with self-supervision through the pseudo-labels generated on the real-world scene in which the mobile construction robot is deployed. Thus, the semantic model is continuously updated.

With reference to the nomenclature often used in continual learning, each new environment is named a "task", and "task boundaries" are assumed to be known. Every time the mobile construction robot is moved to a new environment, the same scheme as above is applied, i.e., the semantic model trained on the previous environments is provided as new training data the classes or, respectively, the pseudo-labels generated from the current environment.

In order to achieve this domain adaptation and allow the semantic model to improve the semantic segmentation accuracy on the current environment in which it is deployed without forgetting information learned on previous tasks, a method is adopted based on memory replay buffers.

When adapting to a new environment, each training batch is filled with frames collected in the current environment, along with a small fraction of images collected in the previous environments, so that the semantic model is, in particular continuously, updated with a mix of current and previously gathered semantic segmentation data.

Hence, in each training step, the semantic model is to be jointly optimized over data from current and previous environments. However, storing all observations or sematic segmentation data from past environments in memory would require a large memory space.

To solve this problem, according to the invention a memory buffer for each of the previous environments only contains a random subset of all image and pseudo-label or label attributions.

Training batches are then filled from the memory buffers of previous environments alongside with self-supervised labels of the current environment.

According to a preferred variant of the method 10 according to the invention, a batch of size 10 may be used. The semantic model may be trained for, e.g. up to 100 epochs. Preferably, early stopping with a patience of 20 epochs based on a validation loss may be used. In different variants the replay buffers may be filled according to a ratio between the target and the NYU data of between 1:1 and 200:1, e.g. 1:1, 3:1, 4:1, 10:1, 20:1, or 200:1. The replay buffers may also be filled according to a replay fraction of between 1% and 30%, e.g. 5% or 10%. Preferably a replay fraction of 10% is used.

The semantic model based on Fast-SCNN preferably has a total of 1 to $2 \times 10^6$, e.g. approximately $1.8 \times 10^6$, trainable parameters.

Group normalization may be used in all layers, which, in general, has been found to perform better in regard to the required transfer-learning tasks than alternative normalization methods like batch normalization.

In variants of the method 10 different strategies for memory replay may be used. A first strategy, which is the one adopted in the variant of the method 10 as described before, on each source (e.g. NYU data set)-to-target (e.g. construction site) transfer, the replay buffer may be refilled with a fraction of randomly selected samples from the source dataset(s), here the NYU dataset. Then, the training batches are filled from the replay buffer and the target dataset according to their relative sizes.

According to an alternative, second strategy, the replay buffer may be filled with the full source dataset, whereas training batches are filled with a pre-defined target-to-source ratio. For instance, a ratio Construction site to NYU of 4:1 with a batch size of 10 indicates that batches on average contain 8 images from the construction site and two images from NYU.

Larger target-to-source ratios, or smaller replay fractions, have shown to achieve higher performance on the target domain, but cause the amount of information retained from the source domain to drop. At the same time, the segmentation quality on the pseudo-labels of the target dataset follows an inverse trend, generally increasing for smaller amounts of replay. This highlights the trade-off between the accuracy on the target and on the source domain.

Further variants of the method 10 according to the invention may make use of alternative continual learning methods, for example regularization methods. One example may be a distillation approach, in which a weighted regularization term $L_d$ is added to a cross entropy loss $L_{ce}$ to encourage the semantic model to retain knowledge from previous tasks. This distillation may be either applied to output logits produced by the semantic model (output distillation) or on intermediate features extracted from the model architecture before a final classification module (feature distillation).

A further alternative may be an elastic weight consolidation (EWC), in which deviations of network parameters across tasks are penalized.

Overall, replay buffers have shown to be very effective in minimizing the amount of forgetting on the NYU dataset, and generally allow attaining a good trade-off with the segmentation quality on the pseudo-labels from the target domain.

Construction Robot System

FIG. 3 shows a construction robot system 100 on a construction site, the construction robot system 100 comprising a mobile construction robot 102 and a control unit 104, which is schematically represented in FIG. 3.

In this embodiment, the control unit 104 is arranged inside the mobile construction robot 102. It comprises a computing unit 106 and a computer program product 108 including a storage readable by the computing unit 106. The computing unit 106 comprises a neuronal network unit configured as semantic classifier 18 as described in reference to FIG. 1. The storage carries instructions which, when executed by the computing unit 106, cause the computing unit 106 to execute the method according to the invention and as described previously.

Furthermore, the mobile construction robot 102 comprises a robotic arm 110. It comprises an end effector, on which a power tool 113 is detachably mounted. The power tool 113 may be a drilling machine. It may comprise a vacuum cleaning unit for an automatic removal of dust. The robot arm 110 and/or the power tool 113 may also comprise a vibration damping unit.

The control unit 104 is configured to control the robotic arm 110. It may comprise further modules, for example a communication module, in particular for wireless communication, e.g. with an external cloud computing system (not shown in FIG. 3), a display unit, or the like.

Furthermore, the control unit 104 is configured to control a mobile base 116 of the mobile construction robot 102. In this embodiment, the mobile base 118 is a wheeled ground vehicle, on which other parts of the mobile construction robot 102 are mounted.

The mobile construction robot 102 may be configured for drilling floors, walls and/or ceilings. For this, the robotic arm 110 may, preferably, be capable of moving according to at least 6 degrees of freedom.

The mobile construction robot 102 comprises a plurality of sensors and localization support elements. In particular, it comprises a camera system 112 comprising three 2D-cameras. It further comprises a LIDAR scanner 114. Both elements 112 and 114 are aligned to each other and connected to the control unit 104. Furthermore, the cameras of the camera system 112 are time-synchronized with the LIDAR scans from the LIDAR scanner 114.

The mobile construction robot 102 may further comprise other pose-aware sensors or elements, e.g. an inertial measurement unit (not shown in FIG. 3).

The mobile construction robot 102 may also comprise a reflector 110 or another kind of detectable point, which can be used to additionally localize the mobile construction robot 102, e.g. by using a total station for a measurement of a relative displacement between, for example, a starting pose and a current pose.

The invention claimed is:

1. A method of localizing a mobile construction robot on a construction site, wherein environment data of the construction site is captured, wherein a pose of the mobile construction robot is inferred using the environment data, the method comprising matching environment data with a building information model (BIM) to generate localization; generating pseudolabels based on the localization in reference to the BIM to train a semantic classifier; wherein segmentation into construction side foreground and construction site background informs the localization; and, semantic segmentation, wherein the semantic classifier having an updatable semantic model classifies the environment data into at least two semantic classes, wherein the semantic model is updated at least once by assigning points of environment data comprising 3D environmental data to one of the two semantic classes, if a distance of the points to BIM data surpass a threshold, and otherwise assign the points of environment data comprising 3D environmental data to the other one of the two semantic classes, wherein at least one of the at least two semantic classes corresponds to construction site background and at least one of the at least two semantic classes corresponds to construction site foreground.

2. The method according to claim 1, comprising updating the semantic model using the environment data.

3. The method according to claim 1, comprising inferring the pose using a subset of the environment data that is classified as construction site background.

4. The method according to claim 1, comprising refining the semantic segmentation of the environment data at least once using at least one additional data set.

5. The method according to claim 1, comprising inferring the pose using map data of the construction site.

6. The method according to claim 1, comprising updating the semantic model multiple times.

7. The method according to claim 1, comprising updating the semantic model with a mix of current and previously gathered semantic segmentation data.

8. The method according to claim 1, comprising fixing the set of semantic classes for all semantic segmentations.

9. A construction robot system comprising a mobile construction robot and a control unit, wherein the control unit is configured to localize the mobile construction robot using the method according to claim 1.

10. The construction robot system according to claim 9, wherein the mobile construction robot comprises a 3D sensor or a stereoscopic camera system, and at least one camera.

11. A computer program product including a storage readable by a control unit of a construction robot system, the storage carrying instructions which, when executed by the control unit, cause the control unit to execute the method according to claim 1.

12. The method according to claim 4, comprising refining the semantic segmentation of the environment data at least once using at least one image data set.

13. The method according to claim 5, comprising inferring the pose using building information model data.

14. The method according to claim 6, comprising updating the semantic model regularly.

15. The method according to claim 2, comprising inferring the pose using a subset of the environment data that is classified as construction site background.

16. The method according to claim 2, comprising refining the semantic segmentation of the environment data at least once using at least one additional data set.

17. The method according to claim 2, comprising inferring the pose using map data of the construction site.

18. The method according to claim 2, comprising updating the semantic model multiple times.

19. The method according to claim 1, comprising inferring the pose using a subset of the environment data that is classified as construction site background and using map data of the construction site.

20. The construction robot system according to claim 9, wherein the mobile construction robot comprises a 3D sensor or a stereoscopic camera system, and at least one camera, wherein the construction robot is configured to infer a pose using a subset of environment data that is classified as construction site background.

* * * * *